United States Patent [19]

Hughes et al.

[11] Patent Number: 4,517,404
[45] Date of Patent: May 14, 1985

[54] MULTIPLE FLUID CONVEYING HOSE ASSEMBLY AND METHOD OF MAKING SAME

[75] Inventors: William E. Hughes, Dayton; Keith E. Dare, Powell, both of Ohio; Jerry W. Cooper, Haywood County, N.C.

[73] Assignee: Dayco Corporation, Dayton, Ohio

[21] Appl. No.: 463,354

[22] Filed: Feb. 2, 1983

[51] Int. Cl.³ .................. A47L 9/24; F16L 11/12
[52] U.S. Cl. .................. 174/47; 29/858; 138/109; 138/111; 285/7; 285/137 R; 339/16 R
[58] Field of Search .................. 174/47; 15/321, 322; 29/858; 137/561 A; 138/109, 111, 114; 285/7, 131, 133 R, 137 R; 339/15, 16 R, 16 C

[56] References Cited

U.S. PATENT DOCUMENTS

| 386,751 | 7/1888 | Loomis | 138/111 X |
|---|---|---|---|
| 2,341,129 | 2/1944 | Thompson | 137/149 |
| 2,602,608 | 7/1952 | Darling | 174/47 X |
| 2,844,840 | 7/1958 | Gray | 15/321 |
| 2,917,568 | 12/1959 | Moorman et al. | 174/47 |
| 2,949,620 | 8/1960 | Noble | 15/321 X |
| 3,733,697 | 5/1973 | Wickham et al. | 29/858 |
| 4,086,937 | 5/1978 | Hechler | 137/559 |
| 4,336,798 | 6/1982 | Beran | 138/111 X |
| 4,385,413 | 5/1983 | Goldsmith | 15/321 X |

FOREIGN PATENT DOCUMENTS 2031270 4/1980 United Kingdom .................. 15/321

Primary Examiner—Laramie E. Askin
Attorney, Agent, or Firm—Joseph V. Tassone

[57] ABSTRACT

A multiple fluid conveying hose assembly comprising a principal vacuum conveying hose for a vacuum cleaning system, and a smaller diameter liquid conveying hose passing through its interior. A molded end connector on the principal hose provides an outlet for the smaller hose and serves to separate the ends of the two hoses for use. Alternatively, the hose may utilize reinforcing wire coils which also serve as electrical conductors.

7 Claims, 4 Drawing Figures

MULTIPLE FLUID CONVEYING HOSE ASSEMBLY AND METHOD OF MAKING SAME

BACKGROUND OF THE INVENTION

1. Field of the Invention

The present invention relates to a multiple fluid conveying hose assembly having a first hose connected to a vacuum source, and a smaller diameter second hose within its interior, used to convey fluids. The invention is also directed to hose connectors on the ends of the principal hose through which the smaller hose passes, to a method of making the hose assembly and the connectors; and the method of interconnecting the hoses.

2. Prior Art Statement

It is known in the art to provide multiple hoses for conveying two separate fluids, either by coupling the hoses in side-by-side relationship, or by passing one hose partially within the interior of another hose. It is also known to pass an electrical cable or wire through the interior of a hose and extend it through the wall of the hose. It is also known to mold end connectors to vacuum cleaner hoses for the purpose of creating electrical continuity from the reinforcing wires to electrical outlets at the hose ends.

Some of these features are shown in the following U.S. Patents:

Thompson U.S. Pat. No. 2,341,129
Darling U.S. Pat. No. 2,602,608
Moorman et al U.S. Pat. No. 2,917,568
Wickham et al U.S. Pat. No. 3,733,697
Hechler, IV U.S. Pat. No. 4,086,937

The Darling and Moorman et al patents illustrate two types of oxygen delivery hose in which an electrical cable within the hose is passed through the wall for access outside the hose. The cable in Moorman et al passes within the principal opening, namely the central oxygen-carrying passage. The cable in Darling is wrapped around the inner tube and enclosed by the outer tube.

The Thompson patent refers to a siphon assembly in which a small diameter vent hose is inclosed within part of the principal hose, but is far short of one end of the hose and reaches only to the valve at the other end of the hose, and does not pass through the wall at any point.

The Wickham et al patent is illustrative of an end connection which may be molded to the ends of a spirally reinforced vacuum cleaner hose to permit electric access.

The Hechler patent illustrates a dual hose for conveying two separate liquids. It comprises a small diameter hose on the outer wall of a larger diameter hose, both hoses having a common wall at one point to prevent kinking.

SUMMARY OF THE INVENTION

The invention provides a multiple hose assembly, comprising a first hose of large diameter, and a second hose of smaller diameter. These hoses may be used to simultaneously convey two separate fluids; for example, the first hose has a central opening connected to a vacuum source, and the smaller hose passes through this central opening and extends throughout at least substantially the full length of the main hose. The smaller hose may conduct water or soap, and thus the assembly is particularly well adapted for shampooing rugs and carpets. This may be done by first supplying liquid soap, followed by water, or water alone, through the small hose, and then vacuuming up the resulting emulsified dirty water from the rug through the central opening of the main hose. Alternatively, the principal hose may be of the wire-supported, current-carrying type illustrated in the Wickham et al patent, in order to drive a power tool on the carpet as suggested by that patent.

Thus, although the prior art has suggested running electrical cables through the interior of the hose and out the walls, these are not fluid conveying means. The prior art has also suggested a dual hose assembly in which one hose is exterior of the other, or a siphon hose having a smaller vent partially within the hose. Neither of these smaller hoses pass through the walls.

The present invention further provides for a molded end connector through which the smaller hose may be passed to the exterior, either axially of or at right angles to the hose.

The present invention further provides a method of manufacturing the hose to create the relationship of its components and carry out its purposes.

The objects, uses, and advantages of this invention are apparent from the following descriptions and drawings.

DESCRIPTION OF THE PREFERRED EMBODIMENTS

Figure 1:
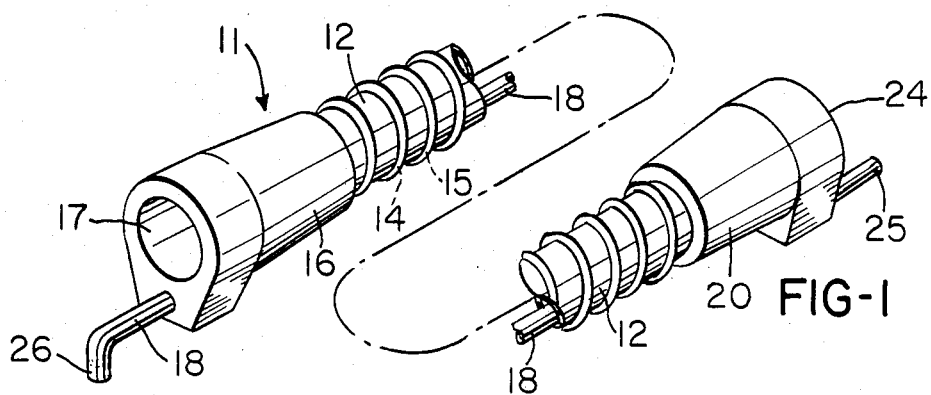
FIG. 1 is a perspective view of the novel hose assembly, indicating the relationship of the first and second hoses.
Figure 2:
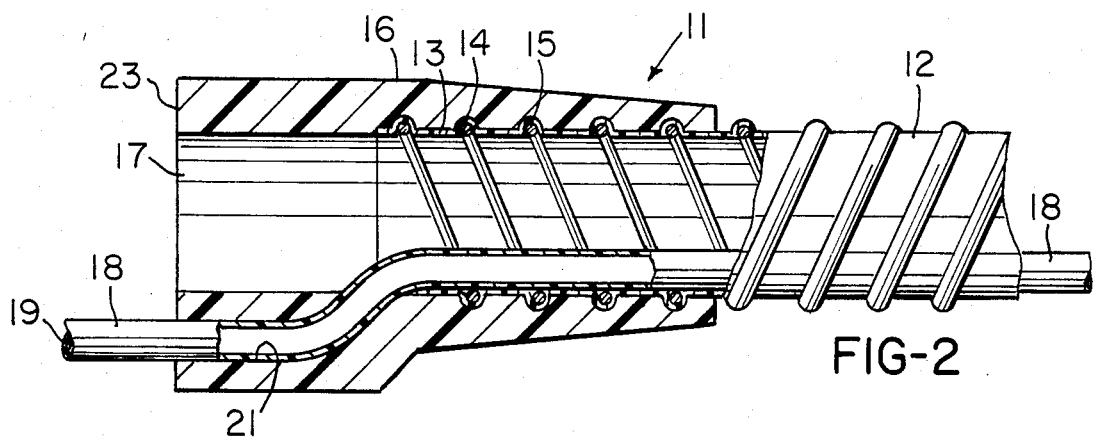
FIG. 2 is an elevational view, partially in cross-section, illustrating one end of the novel hose assembly construction and the relationship of the parts.

Referring now to the drawings, FIGS. 1 and 2 illustrate a principal exemplary embodiment of the multiple hose assembly 11, the first hose comprising a vacuum cleaner hose 12 formed of a tube 13, made of an elastomeric material such as vinyl. The tube is internally supported by a pair of axially spaced helical reinforcing coils 14 and 15, whose coils alternate with each other in a manner known in the art. These coils are made of steel wires, coated with a suitable plastic to promote bonding with the tube. If desired, a single coil may be used. The hose 12 may be of suitable diameter, generally about 2 inches.

A hose connector 16 is molded around one end of the hose, a corresponding connector 20 is molded to the other end of the hose 12, and an opening 17 is continuous through both connectors and the hose. A second and smaller diameter hose 18, which is of non-reinforced elastomeric construction, extends through the opening 17 until reaching the connectors 16 and 20. This hose generally has a diameter of about one-half inch. The hose 18 is then passed through the opening 21 in connector 16, and through a similar opening (not shown) in connector 20, so that it exits through the end 23 of connector 16, and the corresponding end 24 of connector 20. The hose 18 has an opening 19 which extends entirely throughout its length.

The connectors 16 and 20 may be applied to the ends of the hose 12 by any of several methods. One such method is similar to that set forth in the above-referenced U.S. Pat. No. 3,733,697 to Wickham et al (of common assignment). As described in detail in that patent, the connectors may be molded to the hose ends by placing the ends within mold cavities and injecting plastic material under heat and pressure to create the connectors in accordance with the shape of the molds. In the present invention, the hose 18 is placed within the mold and held in place by suitable means so that it is passed through the connector as shown.

The completed hose assembly is then used to convey its separate fluids. The connectors may be connected to a vacuum cleaner at one end by means of inter-related structure such as shown in the Wickham et al patent, for example. The other end is then connected to a suitable carpet cleaning device, or other device, by similar interlocking means. The smaller hose may then be connected at one end 25 to a source of liquid soap or water, which is pumped through this hose to the other end 26, which may then be connected to a spray nozzle or other dispensing means. Thus the liquid soap or water is used to create an emulsion with the dirt in the rug, which is then vacuumed up. By combining the two hoses in the manner shown, this result may be achieved without an extra exposed tube, as in the prior art, which may become entangled with other objects. Such an assembly is also easier to store.

Figure 3:
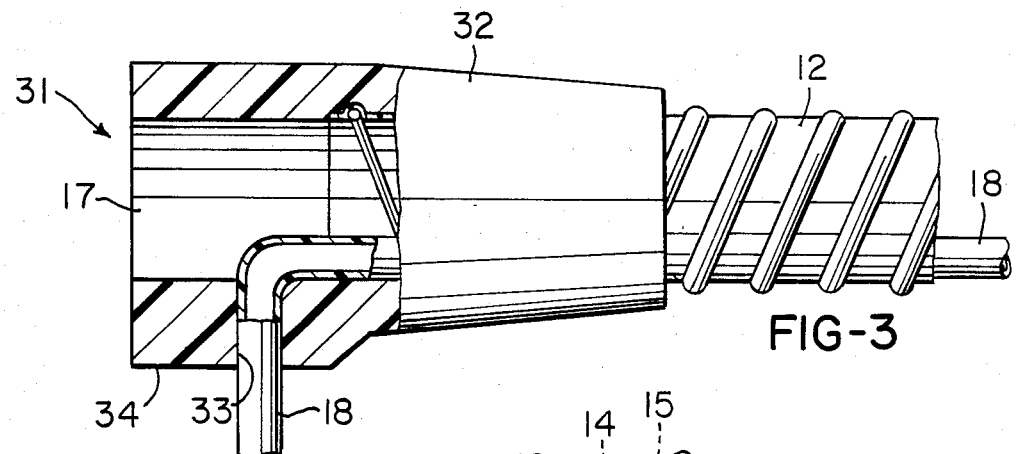
FIG. 3 is a view similar to FIG. 2, illustrating another form of the invention.

In certain apparatus, passage of the small hose through the end wall of the connectors may interfere with coupling the large hose to the vacuum cleaner or tool. In this case, it is also contemplated to modify the hose design as shown in FIG. 3. The hose assembly 31 is similar to hose assembly 11, being formed of a first large diameter hose 12 and a second smaller diameter hose 18 which passes through opening 17. However, in order to avoid a potential interference, the hose 18 passes through the outer wall 34 of the connector 32, specifically through the opening 33 in the wall. This creates a side exit, rather than an end exit. This molding process is similar to the process described above except for placement of the hose 18 through the connector.

Figure 4:
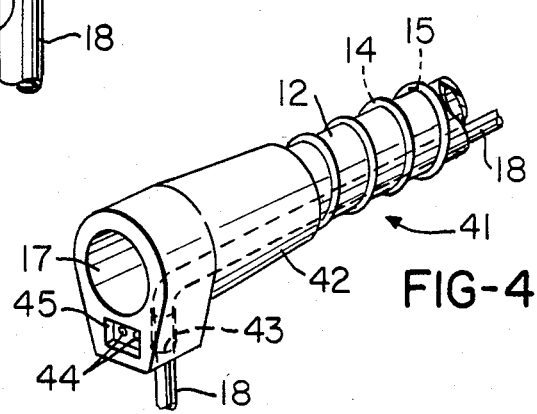
FIG. 4 is a view similar to FIG. 1, illustrating still another form of the invention.

A further modification of the invention is shown in FIG. 4. The hose assembly 41 is similar to the hose assembly 31, consisting of the same first hose 12 and second hose 18, passing through opening 17. The connector 42 is similar to connector 32, except that it incorporates electrical outlet means terminating in female electrical terminals 44 which are accessible within opening 45 in the end of the connector 42. The two terminals 44 are connected to each of the wire coils 14 and 15 by means of connecting wires in a manner such as described in the above-referenced Wickham et al patent. Inasmuch as the coils are separate electrical conductors, current may be carried from the vacuum cleaner into which the other end of the hose 12 is plugged via a connector similar to connector 42, as further detailed in Wickham et al. A powered cleaning tool or other device may then be connected to the terminals 44, as shown in Wickham et al. Thus, the soap or water may be conveyed through hose 18 as described above, vacuum may be passed through the hose 12, and a power tool may be operated, all at the same time. This three-way function is more easily carried out by means of the novel multiple hose assembly.

It can thus be seen that the present invention is directed to the novel multiple hose assembly, as well as to the novel method of making the assembly.

While specific embodiments of the invention have been described and illustrated, other forms of the invention are specifically contemplated as falling within the scope of the following claims.

We claim:

1. A multiple fluid conveying hose assembly comprising of first hose having a tubular wall defining a passage internally thereof and axially spaced helical reinforcing coils for said tubular wall, a second hose linearly positioned within said passage of said first hose, and a connector on at least one end of said first hose having an end wall at right angles to the longitudinal axis of said first hose, said second hose being coextensive with the entire length of said first hose and said connector and passing through said end wall of said connector to the exterior of said first hose and having an outlet separate from the outlet of said first hose.

2. The hose assembly of claim 1 wherein said reinforcing coils are separate electrical conductors, and said connector further comprises electrical connection means contacting said coils, said electrical connection means proividing electrical continuity from said coils to the exterior of said connector.

3. The hose assembly of claim 1 wherein said connector is molded on said first hose.

4. The hose assembly of claim 1 wherein said second hose has a diameter substantially less than the diameter of said first hose.

5. The hose assembly of claim 1 wherein said second hose has a diameter about one-fourth the diameter of said first hose.

6. The method of making a multiple fluid conveying hose assembly comprising the steps of forming a first hose having an internal passage, locating axially spaced helical reinforcing coils within said first hose, said coils providing electrical continuity throughout the length of said hose; providing a connector having an end wall and an outer wall surrounding at least one end of said hose, placing electrical connection means within said connector and interconnecting said coils and said electrical connection means; positioning a second hose within said passage of said first hose and coextensive with the entire length of said first hose and said connector, and passing said second hose through said end wall of said connector to the exterior of said first hose.

7. The method of claim 6 including the step of molding said connector to the outer surface of said first hose to form an integral connector.

* * * * *

UNITED STATES PATENT AND TRADEMARK OFFICE
CERTIFICATE OF CORRECTION

PATENT NO. : 4,517,404
DATED : May 14, 1985
INVENTOR(S) : William E. Hughes, et al.

It is certified that error appears in the above—identified patent and that said Letters Patent is hereby corrected as shown below:

Column 4, line 16 (claim 1, line 2):

"of" should be --a--

Column 4, line 31 (claim 2, line 5):

"proividing" should be --providing--

Signed and Sealed this

Ninth Day of March, 1993

*Attest:*

STEPHEN G. KUNIN

*Attesting Officer*   Acting Commissioner of Patents and Trademarks